(12) United States Patent
Hillion et al.

(10) Patent No.: US 7,612,245 B2
(45) Date of Patent: Nov. 3, 2009

(54) METHOD FOR SELECTIVE HYDROGENATION OF POLYUNSATURATED COMPOUNDS INTO MONOUNSATURATED COMPOUNDS USING A HOMOGENEOUS CATALYST

(75) Inventors: Gerard Hillion, Herblay (FR); Laurent Savary, Carrieres sur Seine (FR); David Proriol, Le Port Marly (FR); Christophe Gautreau, Montesson (FR); Denis Uzio, Simandres (FR); Helene Olivier-Bourbigou, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 510 days.

(21) Appl. No.: 10/519,355

(22) PCT Filed: Jun. 16, 2003

(86) PCT No.: PCT/FR03/01811

§ 371 (c)(1),
(2), (4) Date: Dec. 19, 2005

(87) PCT Pub. No.: WO2004/002624

PCT Pub. Date: Jan. 8, 2004

(65) Prior Publication Data

US 2006/0129010 A1    Jun. 15, 2006

(30) Foreign Application Priority Data

Jun. 28, 2002    (FR)    .................. 02 08160

(51) Int. Cl.
*C07C 5/02* (2006.01)
*B01J 31/00* (2006.01)
(52) U.S. Cl. .......... 585/261; 585/262; 585/275; 585/276; 585/277; 502/103; 502/153; 502/155; 502/164; 502/210; 502/211; 502/213
(58) Field of Classification Search ............ 585/259, 585/261, 262, 275, 276, 277; 502/103, 104, 502/113, 117, 118
See application file for complete search history.

(56) References Cited

U.S. PATENT DOCUMENTS

| | | | | |
|---|---|---|---|---|
| 3,865,893 A | * | 2/1975 | Thatcher et al. | ............ 585/277 |
| 3,890,400 A | | 6/1975 | Langrange et al. | |
| 3,917,737 A | * | 11/1975 | Yoo | ............... 585/277 |
| 4,357,478 A | | 11/1982 | Hillion et al. | |
| 6,040,263 A | * | 3/2000 | Mussmann et al. | .......... 502/164 |
| 2001/0005758 A1 | | 6/2001 | Bach et al. | |

* cited by examiner

*Primary Examiner*—In Suk Bullock
(74) *Attorney, Agent, or Firm*—Millen, White, Zelano & Branigan, P.C.

(57) ABSTRACT

A process for the selective hydrogenation of diolefinic compounds to mono-olefinic compounds uses a catalyst composition comprising at least one salt of a transition metal from groups IB, IIB, VB, VIB, VIIB and VIII of the periodic table, at least one ligand and at least one organometallic reducing agent, optionally in the presence of a non-aqueous ionic liquid selected from the group formed by liquid salts with general formula $Q^+A^-$ (in which $Q^+$ represents a quaternary ammonium and/or quaternary phosphonium and $A^-$ represents any anion which can form a liquid salt below 90° C.).

24 Claims, No Drawings

METHOD FOR SELECTIVE HYDROGENATION OF POLYUNSATURATED COMPOUNDS INTO MONOUNSATURATED COMPOUNDS USING A HOMOGENEOUS CATALYST

The present invention relates to hydrogenating diolefinic compounds to monoolefinic compounds.

It pertains to a process for hydrogenating unsaturated compounds using a catalytic composition.

Hydrocarbon conversion processes such as steam cracking, visbreaking, catalytic cracking and cokefaction are carried out at high temperatures to allow a large quantity of unsaturated compounds the formation of which is favoured at high temperatures to be formed: acetylenic compounds (acetylene, propyne, vinyl- and ethyl-acetylene), diolefinic compounds such as 1,2-propadiene, 1,2-butadiene and 1,3-butadiene, olefinic compounds such as ethylene, propylene, 1-n-butene, 2-n-butenes, isobutene, pentenes and other compounds the boiling point of which is in the "gasoline" cut range and which may be olefinic or diolefinic. The most highly unsaturated compounds (acetylenic and diolefinic) are highly unstable and very readily produce high molecular weight products (oligomers, gums) by polymerization reactions. Such highly unsaturated compounds must therefore be eliminated to allow different cuts derived from said processes to be used for chemistry or for olefin polymerization processes. As an example, the steam cracking $C_4$ cut contains a high proportion of 1,3-butadiene which must be eliminated before it can be used in butene polymerization units. Similarly, methylacetylene (MA) and propadiene (PD) compounds present in the $C_3$ steam cracking cut in an amount of 3% to 4% by weight must be eliminated before the propylene can be used to synthesize polypropylene. Specifications for highly unsaturated compounds for feeds to polymerization units are very severe given the high sensitivity of new classes of polymerization catalysts (metallocenes) to such compounds. Specifications regarding the quality of polymers produced also require that the treated feeds should be very pure.

Conventionally, 1,3-butadiene is separated from the olefinic cut, for example by extractive distillation in the presence of dimethylformamide or N-methyl-pyrrolidone. The olefinic cut obtained contains isobutane, isobutene, 1-butene, 2-butenes, n-butane and 1,3-butadiene, this latter being in an amount of between 0.1% and 2% by weight.

If 1,3-butadiene is not upgraded, the cut can be treated directly over a catalyst in the presence of hydrogen to transform the 1,3-butadiene into n-butenes.

If 2-butene is desired, processes which can produce a great deal of 2-butene and separate different compounds must be used, such as selective hydrogenation of 1,3-butadiene to butanes with a high degree of isomerization of 1-butene to 2-butene. 2-butene is used as a feedstock for petrochemicals. That type of use necessitates almost complete hydrogenation of the 1,3-butadiene as its presence can only be tolerated in amounts of less than 10 ppm by weight.

When low 1,3-butadiene contents are to be achieved with conventional nickel or palladium based catalysts, a reduction in the 2-butene content is observed due to the formation of butane. Limiting consecutive hydrogenation and thus butane formation imposes more restrictions on any solutions which may be proposed.

A further application that can be envisaged is the reduction in the 1,3-butadiene content in a 1-butene rich cut without transforming the latter into butane or isomerizing it to 2-butene, cis and/or trans. That reaction can be integrated into a 1-butene production process carried out in a finishing reactor which can reduce the 1,3-butadiene content to less than 10 ppm.

As described in the literature (see, for example, "Proceedings of the DGMK conference", 11-13 Nov. 1993, Kassel, Germany: "Selective hydrogenation catalysts and processes: bench to industrial scale"—Boitiaux J P et al), the hydrogenation selectivity of highly unsaturated compounds (diolefins or acetylenic compounds) to olefins derives from strong complexation of the unsaturated compound on the palladium, preventing access of the olefins to the catalyst and thus preventing their transformation into paraffins. This fact is clearly illustrated in the publication cited above in which 1-butyne is selectively transformed into 1-butene on a palladium-based catalyst. However, it should be noted that this hydrogenation rate is relatively low, and the kinetics are generally negative with respect to the acetylenic compound. When all of the acetylenic compound has been completely converted, consecutive hydrogenation of 1-butene is carried out at a much higher rate than hydrogenation of the acetylenic compound. In the case of 1,3-butadiene and for conventional catalysts, the diene hydrogenation rate is generally close to that of the olefin when the molecules are not mixed or hydrogenated consecutively.

That phenomenon poses a certain number of problems as regards industrial units. Firstly, to satisfy specifications for 1,3-butadiene in the olefinic cut, very high 1,3-butadiene conversions are required. This has the effect of greatly reducing the concentration of 1,3-butadiene in the reactor and in particular at the outlet, to values which are lower than those corresponding to covering the catalyst surface completely. Thus, olefinic molecules have access to the active surface and as their hydrogenation rate is of the same order as that of 1,3-butadiene, they are consumed. A large quantity of 1,3-butadiene is transformed into butane. Thus, it would be of great advantage to find a catalyst that allowed 1,3-butadiene hydrogenation at a rate which was higher than that of 2-butene hydrogenation, whether those compounds were hydrogenated alone or as a mixture. Achieving high selectivities and satisfying severe specifications for highly unsaturated compounds thus requires catalysts that result in high ratios between the 1,3-butadiene hydrogenation rate constant and that for butenes. A further interesting catalytic system is constituted by an active site which can minimize the hydrogenation rate of the least unsaturated compound (olefin) independently of the diolefin or acetylene. The importance of such a catalyst is not limited to an increase in its 2-butene selectivity, but it can also allow better control of the hydrogenation process. In the event that minor local hydrogen distribution problems are encountered, using such a catalyst does not result in a high degree of conversion of butenes to butane and will thus reduce problems connected with high exothermicity linked to such poorly controlled hydrogenations, which aggravate the distribution problems.

Further, with $C_4$ cuts which have very low boiling points, it is possible to keep the catalyst in the reaction medium and to recover the effluents in the gas phase. Continuous injection of the liquid catalyst, representing several ppm of metal, can be envisaged to keep the catalytic activity stable over time.

To solve this problem, then, it is of interest to develop a hydrogenation catalyst which would allow hydrogenation of 1,3-butadiene to butenes and which would have low activity for consecutive hydrogenation of 1-butene or 2-butene to butane.

Thus, the aim of the invention is to provide a liquid catalytic composition which allows selective hydrogenation of polyunsaturated compounds to monounsaturated compounds.

Said catalytic composition allows hydrogenation of diolefinic compounds to mono-olefinic compounds at rates which are at least 3 times and generally about 5 times higher than the hydrogenation rate of α-olefinic compounds to saturated compounds. This soluble catalyst can be generally defined as comprising at least one salt of a transition metal from groups IB, IIB, VB, VIB, VIIB and VIII, at least one ligand and at least one organometallic reducing agent.

More particularly, the catalytic composition used in the process of the invention is characterized:
in that the metal is at least one metal selected from metals from groups IB, IIB, VB, VIB, VIIB and VIII, preferably IB, IIB, VIB and VIII of the periodic table, more particularly from iron, cobalt, nickel, copper, chromium, molybdenum, zinc, palladium and ruthenium. Said metals can be introduced in the form of halides or acetylacetonates, and preferably in the form of organic acid carboxylates containing 2 to 25 carbon atoms. Examples of the latter which can be cited are acetates, octoates, decanoates, naphthenates, stearates, palmitates, oleates and benzoates;
in that the reducing agent is selected from organometallic derivatives of at least one metal from the group formed by lithium, sodium, aluminium and even mixed derivatives of aluminium and sodium and/or lithium. They have at least one carbon-metal or hydrogen-metal bond, each of said bonds corresponding to a reducing function. Said reducing agents are either directly in the liquid form or in the form of a solid which must be dissolved in a suitable solvent. Examples are organoaluminic compounds with general formula $AlR_y(X)_{3-y}$, in which R is an alkyl group, for example methyl, ethyl, isopropyl, butyl, isobutyl or terbutyl, etc; in which X is a halide and y=1, 2 or 3, magnesians with formula $MgR_2$, aluminoxanes, sodium borohydride and various alkaline hydrides such as $LiAlH_4$ or $NaAlH_4$ themselves or their derivatives obtained by substituting 1 to 3 hydrogen atoms with 1, 2 or 3 alkoxy groups, for example $LiAlH_3(OR)$, $LiAlH_2(OR)_2$ or $LiAlH(OR)_3$ in which R is an alkyl group, for example methyl, ethyl, isopropyl, butyl, isobutyl or tert-butyl; and
in that the ligand is selected from derivatives of phosphorus, arsenic or antimony, or nitrogen-containing ligands.

Examples of ligands selected from phosphorus, arsenic and antimony that can be cited are ligands of the following type:

$YR_mX_{3-m}$, $YR_3$, $R_2Y$—$(CH_2)_n YR_2$, $Y(OR)_3$ or $YOR_3$, in which Y=P, As or Sb; m=0, 1, 2 or 3; R=alkyl, aryl or substituted aryl; X=halogen and n=0, 1, 2, 3 or 4.

Examples of nitrogen-containing ligands which can be cited are amines and polyamines, imidazole, substituted imidazoles, pyrrole and substituted pyrroles, pyrazoles, amide derivatives, imines or diimines (produced, for example, by reacting glyoxal with a derivative of aniline substituted on the aromatic ring), and finally pyridine derivatives.

Particular examples of ligands have the following general formulae:

R—N=CR'—CR'=N—R, $PR_3$ or $R_2P$—$(CH_2)_n$—$PR_2$ in which R'=H or $CH_3$, n=1, 2 or 3 or 4 and R=alkyl, aryl or aryl partially substituted with 1, 2, 3 or 4 methyl, ethyl, isopropyl or methoxy groups. The following developed formulae illustrate certain of said products:

2,3-bis(2,6-dimethylphenylimino)butane:

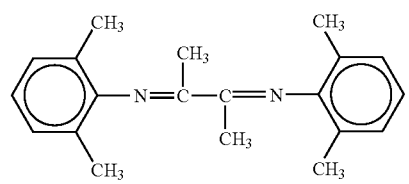

1 bis(2,6-dimethylphenylimino)ethane:

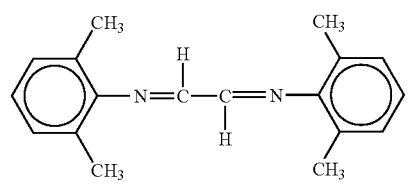

2

2,3-bis(2-methylphenylimino)butane

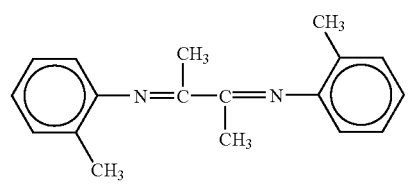

3

2,3-bis(2,6-diisopropylphenylimino)butane

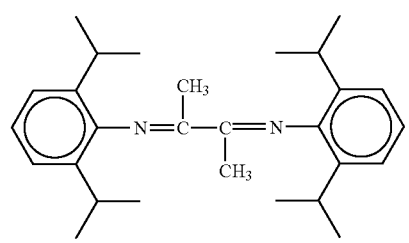

4

2,2-bipyridyl

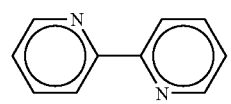

5

2,3-bis(4-methoxyphenylimino)butane:

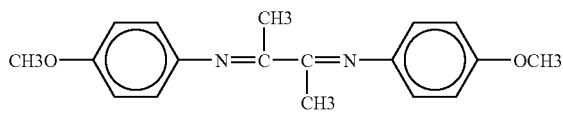

diphenylphosphinoethane:

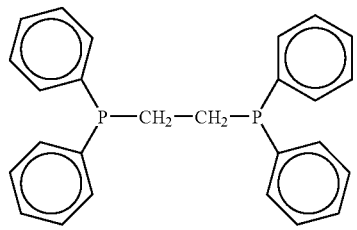

The ligands can also carry a function such as ammonium, phosphonium, a carboxylic acid, an amine, an alcohol or a sulphonate.

Optionally, an organic compound can be used to act as a solvent; the following can act as solvents: aliphatic or aromatic hydrocarbons, ethers, esters, halogenated hydrocarbons and, at low concentrations, sulphoxides and amides; the reaction can also be carried out in the absence of an additional solvent; it is then the polyunsaturated or monounsaturated compound which acts as a solvent.

At least one salt of another transition metal selected (for example if the principal metal is a metal from group VIII) from metals from groups IB, VB, VIB, VIIB and VIII, more particularly (for example if the principal metal is iron) from Co, Ni, Cu, Rh, Pd, Mn, Mo, W and V, preferably from Ni, Cu, Rh and Pd, can be added to the hydrogenation catalyst. The additional metal is introduced in a minor proportion with respect to the principal metal.

It is also possible to carry out the reaction using ionic liquids as solvents for the catalyst.

The invention also concerns a catalytic composition comprising at least one compound of a transition metal from groups IB, IIB, VB, VIB, VIIB and VIII, at least one ligand, at least one reducing agent and at least one ionic liquid with formula $Q^+A^-$, as defined below.

Said solvents which are constituted solely by ions, have physico-chemical properties, in particular their solubility with organic compounds, which can be modified as a function of the choice of anion and cation. Their application in catalysis has been reviewed several times; the most recent is that by R Sheldon, Chem. Commun 2001, 2399. It is then possible to select the ionic liquid so that the products from the reaction are less miscible in the ionic liquid in which the catalyst is dissolved. The reaction thus carried out in a two-phase medium. The products can readily be separated from the catalyst and solvent by simple decanting. The catalyst and the solvent can be recycled.

The Assignee's U.S. Pat. No. 6,040,263 describes the use of said medium associated with complexes of transition metals from groups 8, 9 and 10 (or group VIII) for the hydrogenation of unsaturated compounds.

It has been discovered that complexes of transition metals from groups IB, IIB, VB, VIB, VIIB and VIII, preferably iron, associated with a ligand, in an ionic liquid with general formula $Q^+A^-$, are capable of hydrogenating unsaturated derivatives, in particular diolefins with improved selectivities and activities. In this case, the ligand is preferably a nitrogen-containing ligand selected, for example, from those described above.

The non-aqueous ionic liquid is selected from the group formed by liquid salts with general formula $Q^+A^-$ in which $Q^+$ represents a quaternary ammonium and/or quaternary phosphonium ion and $A^-$ represents any anion which is capable of forming a liquid salt at low temperatures, i.e. below 90° C. and advantageously at most 85° C., preferably below 50° C. Preferred anions $A^-$ are chloroaluminate ions of the $R_xAl_yX_z^-$ type (x=0-4, y=1-3, z=0-10), the nitrate, sulphate, phosphate, acetate, halogenoacetate, tetrafluorborate, tetrachloroborate, hexafluorophosphate, hexafluoroantimonate, fluorosulphonate, alkylsulphonates, perfluoroalkylsulphonates, bis(perfluoroalkylsulphonyl)amides and arenesulphonates, the latter optionally being substituted with halogen groups or halogenoalkyl groups.

The quaternary ammonium and/or phosphonium ions $Q^+$ preferably have general formulae $NR^1R^2R^3R^{4+}$ and $PR^1R^2R^3R^{4+}$ or general formulae $R^1R^2N=CR^3R^{4+}$ and $R^1R^2P=CR^3R^{4+}$ in which $R^1$, $R^2$, $R^3$ and $R^4$, which may be identical or different, represent hydrogen (with the exception of the cation $NH_4^+$ for $NR^1R^2R^3R^{4+}$); preferably, a single substituent represents hydrogen or hydrocarbyl residues containing 1 to 30 carbon atoms, for example alkyl groups, saturated or non saturated groups cycloalkyl or aromatic groups, aryl or aralkyl groups, which may be substituted, containing 1 to 30 carbon atoms.

The ammonium and/or phosphonium ion can also be derived from nitrogen-containing and/or phosphorus-containing heterocycles comprising 1, 2 or 3 nitrogen and/or phosphorus atoms, with general formulae:

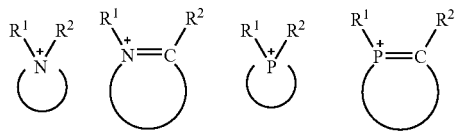

in which the cycles are constituted by 4 to 10 atoms, preferably 5 to 6 atoms, $R^1$ and $R^2$ being as defined above.

The quaternary ammonium or phosphonium can also be a cation with formula:

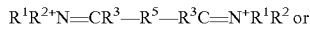

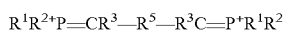

in which $R^1$, $R^2$ and $R^3$, which may be identical or different, are defined as above and $R^5$ represents an alkylene or phenylene residue. Particular groups $R^1$, $R^2$, $R^3$ and $R^4$ which can be mentioned are methyl, ethyl, propyl, isopropyl, butyl, secondary butyl, tertiary butyl, amyl, methylene, ethylidene, phenyl or benzyl radicals; $R^5$ may be a methylene, ethylene, propylene or phenylene group.

The ammonium and/or phosphonium cation $Q^+$ is preferably selected from the group formed by N-butylpyridinium, N-ethylpyridinium, pyridinium, 3-ethyl-1-methylimidazolium, 3-butyl-1-methylimidazolium, 3-hexyl-1-methylimidazolium, 3-butyl-1,2-dimethylimidazolium, diethylpyrazolium, N-butyl-N-methylpyrrolidinium, trimethylphenylammonium, tetrabutylphosphonium and tributyl-tetradecylphosphonium.

Examples of salts which can be used in the invention that can be cited are N-butylpyridinium hexafluorophosphate, N-ethylpyridinium tetrafluoroborate, pyridinium fluorosulphonate, 3-butyl-1-methylimidazolium tetrafluoroborate, 3-butyl-1-methylimidazolium hexafluoroantimonate, 3-butyl-1-methylimidazolium hexafluorophosphate, 3-butyl-1-methylimidazolium trifluoroacetate, 3-butyl-1-methylimidazolium trifluoromethylsulphonate, 3-butyl-1-methylimidazolium bis(trifluoromethylsulphonyl)amide, trimethylphenylammonium hexafluorophosphate and tetrabutylphosphonium tetrafluoroborate. These salts can be used alone or as a mixture.

The mole ratio between the ligand and the transition metal salt is in the range 0.5/1 to 10/1, preferably in the range 0.5/1 to 3/1.

If the ligand is monocoordinating, it can usefully be used in a ligand/transition metal salt mole ratio of 2/1 to 3/1. If the ligand is bicoordinating, it is preferably used with a ligand/transition metal salt mole ratio of 1/1 to 1.5/1.

The mole ratio between the reducing agent and the transition metal salt is generally 1/1 to 5/1, preferably 1.2/1 to 5/1.

In accordance with the present invention, the catalyst can be prepared in two ways.

The first consists of separately injecting the products into a stainless steel Grignard reactor containing the substrate to be hydrogenated.

The second consists of preparing the mixture ex situ. This procedure has the advantage of allowing the possibility of monitoring the reduction state of the iron visually. When TEA is injected into the flask containing the iron-diimine complex, it can be seen that the initially red solution becomes dark brown. A release of gas constituted by an ethane/ethylene mixture results from the reducing action of TEA. Further, only a single injection per syringe is required into the catalysis reactor. The performances obtained in both operating modes are almost identical.

In general, it is preferable to add the ligand to the iron compound in the presence of a diolefin, before adding the reducing agent. It is also possible to isolate a FeHXL2 (where L is an imine) or FeHXL' (where L' is a diimine) reduced iron complex in which X is a halogen, an acetylacetonate or a carboxylate and to add an alkylaluminium or any other reducing agent in the presence of a diolefin.

In the case of selective hydrogenation of 1,3-butadiene, the catalytic composition is added to the system in catalytic quantities. This quantity, expressed in ppm (parts per million) of metallic compounds in the reaction medium, is in the range 10 to 10000 ppm, preferably in the range 40 to 300 ppm.

The reaction temperature is in the range 0° C. to 70° C., preferably in the range 10° C. to 30° C.

The partial pressure of hydrogen is in the range 0 to 20 MPa, preferably in the range 0.01 to 5 MPa and more preferably in the range 0.5 to 1.5 MPa.

The following examples illustrate the invention without limiting its scope.

EXAMPLE 1

Synthesis of Catalyst

The catalyst defined in the invention was obtained after mixing the three compounds in the following order: metal salt-ligand-reducing agent, in a mole ratio of 1/1/3 respectively.

a) Preparing a solution of iron salt in n-heptane from iron octoate, which is a viscous brown liquid constituted by iron$^{III}$ 2-ethylhexanoate in the presence of a slight excess of 2-ethylhexanoic acid in solution in dearomatized white spirit. That product titrated at 10% by weight of iron. A solution in n-heptane was prepared with a concentration of 0.7 g of iron/100 ml, i.e. 12.5 mMol/100 ml.

b) Preparation of diimine solution (ligand). 2,3-bis(2,6-dimethylphenylimino)butane, with the developed formula (1) shown in the paragraph describing the ligands was used. This diimine was dissolved in n-heptane at a concentration of 1.48 g/100 ml, i.e equivalent to 5 mMol/100 ml.

c) Preparation of solution of reducing agent. Triethylaluminium ([Al(Et)$_3$] or TEA) is liquid in the pure state, and is highly sensitive to water and to oxygen in the air. This self-ignition faculty in contact with air disappears when it is in solution diluted in an inert solvent such as n-paraffins. A dilute solution of triethylaluminium in heptane titrating 1.32 mMol/ml was used. It should be noted that the heptane used as the solvent to dissolve the reagents had to be dried in advance and stored over a molecular sieve to keep it anhydrous.

The first test consisted of introducing in succession, using a syringe, into the Grignard reactor with gentle stirring containing a mixture constituted by 120 ml of n-heptane and 8.4 g of 1,3-butadiene maintained at a temperature of 17° C., 2.7 ml of the iron salt solution, then 6.7 ml of the diimine solution and finally 0.8 ml of the TEA solution. This catalytic composition corresponds to an iron composition of the order of 200 ppm with respect to the reaction medium.

The Grignard reactor was then placed under 1 Mpa of hydrogen and stirring was increased to increase the solubility of hydrogen in the liquid phase. The hydrogen pressure was kept constant in the Grignard reactor and the hydrogen consumption was measured by the reduction in hydrogen pressure contained in an intermediate trap of known volume.

This mode of operation allowed an estimation with a certain degree of accuracy to be made of the theoretical quantity of hydrogen necessary to convert all of the 1,3-butadiene employed and thus of being able to stop the reaction and/or take intermediate samples for analysis. Under the test conditions, hydrogenation of 8.4 g of 1,3-butadiene corresponded to a rapid reduction in pressure in the trap of 3 MPa of hydrogen. If hydrogenation was continued, the reaction rate corresponding to the conversion of butenes into butane was accompanied by a substantial reduction in hydrogen consumption.

In the examples given with 1,3-butadiene, a sample was taken assuming a theoretical consumption of 80% 1,3-butadiene conversion. In the present example, this conversion was obtained after 94 seconds of reaction.

The performances of the catalytic system (activity, selectivity for cis-2-butene and selectivity for 1-butene) are shown in Table 4.

EXAMPLE 2

The operating procedure of Example 1 was used, except that the catalyst was prepared outside the reactor and injected after ex situ reduction. Identical results were obtained as regards selectivity. The reaction time to reach 80% 1,3-butadiene conversion was increased by 20 seconds.

EXAMPLE 3

The operating procedure of Example 1 was used, except that half as much catalyst was introduced, i.e the equivalent of 100 ppm of iron instead of 200 ppm. At this catalyst concentration, 80% conversion was obtained in 120 seconds.

The performances of the catalytic system (activity, selectivity for cis-2-butene and selectivity for 1-butene) are shown in Table 4.

EXAMPLE 4

The operating procedure of Example 1 was used, except that an equivalent of 80 ppm of iron was introduced instead of the 200 ppm and 100 ppm of Examples 1 and 3. In this example, 80% conversion was obtained in 188 seconds. This value was obtained using a hydrogen consumption curve; the values shown in Table 1 allowed several points to be traced.

The performances of the catalytic system (activity, selectivity for cis-2-butene and selectivity for 1-butene) are shown in Table 4.

TABLE 1

| time (sec) | n-C4 (%) | trans 2-bu (%) | 1-bu (%) | cis 2-bu (%) | 1,3-butadiene (%) | selectivity cis-2-bu /Σ butenes |
|---|---|---|---|---|---|---|
| 105 | 0.15 | 0.10 | 040 | 60.95 | 38.35 | 99.18 |
| 162 | 0.20 | 0.20 | 0.55 | 75.85 | 23.20 | 99.02 |
| 488 | 0.40 | 0.30 | 0.95 | 97.85 | 0.55 | 98.74 |

EXAMPLE 5

Comparative Example Using the Catalytic System of the Invention without Using a Ligand An iron concentration of 200 ppm was used, as in Example 1, with an AlEt$_3$/Fe ratio of 3.

80% conversion to 1,3-butadiene was obtained after 125 seconds and the composition of the reaction medium is shown in Table 2.

TABLE 2

| time (sec) | n-C4 (%) | trans 2-bu (%) | 1-bu (%) | cis 2-bu (%) | 1,3-butadiene (%) | selectivity cis-2-bu /Σ butenes |
|---|---|---|---|---|---|---|
| 35 | 0.95 | 1.40 | 9.20 | 10.45 | 78.00 | 49.64 |
| 118 | 3.65 | 5.65 | 34.75 | 26.75 | 29.20 | 39.84 |
| 140 | 5.45 | 7.60 | 44.80 | 30.65 | 11.50 | 36.90 |
| 154 | 17.65 | 9.90 | 45.95 | 31.95 | 0.55 | 36.39 |

EXAMPLE 6

The procedure of Example 1 was repeated, replacing the ligand [2,3-bis(2,6-dimethylphenylimino)butane] with [2,3-bis(2,6-diisopropylphenylimino)butane] (see developed formula n° 4). The reaction time to achieve 80% 1,3-butadiene conversion was 22 seconds.

The results are shown in Table 3

TABLE 3

| time (sec) | n-C4 (%) | trans 2-bu (%) | 1-bu (%) | cis 2-bu (%) | 1,3-butadiene (%) | selectivity cis-2-bu /Σ butenes |
|---|---|---|---|---|---|---|
| 15 | 0.15 | 0.05 | 0.10 | 56.60 | 43.10 | 99.70 |
| 20 | 0.15 | 0.10 | 0.15 | 71.70 | 27.90 | 99.67 |
| 30 | 0.15 | 0.10 | 0.20 | 98.20 | 1.35 | 99.71 |
| 102 | 2.50 | 3.35 | 0.60 | 93.15 | 0.40 | 95.89 |

EXAMPLE 7

Comparative Test Between the Catalyst of the Invention and a Heterogeneous Catalyst Constituted by Palladium Supported on Alumina Under the Operating Conditions Used in Example 1

2 g of palladium/alumina catalyst containing 0.3% of Pd was introduced into the Grignard reactor. Table 6 compares the catalytic activity, expressed in moles of 1,3-butadiene consumed/minutes/g of metal.

The selectivity for cis 2-butene and 1-butene were also compared. These selectivities were measured for a 1,3-butadiene conversion of 80%.

The results are shown in Table 4.

TABLE 4

| example | catalyst | activity (mol/min/g of metal) | selectivity* for cis 2-butene (%) | selectivity* for 1-butene (%) |
|---|---|---|---|---|
| 1 | iron (200 ppm) | 4.74 | 98.50 | 1 |
| 3 | iron (100 ppm) | 2.88 | 99.01 | 0.8 |
| 4 | iron (80 ppm) | 2.23 | 98.60 | 1 |
| 7 | Pd/Al$_2$O$_3$ | 1.98 | 20.00 | 60 |

*selectivities measured at 80% 1,3-butadiene conversion.

The catalyst, which was conventionally used in heterogeneous catalyst, could not directly produce cis 2-butene, but mainly 1-butene.

The compared activity, expressed in moles of converted 1,3-butadiene per minute and per gram of metal, was up to 2.4 times higher with the homogeneous iron-based catalyst. Further, the cis 2-butene selectivity was very high: close to 99%.

The particular feature of the catalytic system was simply the very small quantity of 1-butene produced, for example for example 3 the very small quantity of n-butane formed with a remaining quantity of 1,3-butadiene of the order of 0.5%.

EXAMPLE 8

The operating procedure of Example 1 was used, but the composition of the substrate to be hydrogenated was different. It was a mixture composed of 50% of 1,3-butadiene and 50% of 1-butene.

TABLE 5

| time (sec) | n-C4 (%) | trans 2-bu (%) | 1-bu (%) | cis 2-bu (%) | 1,3-butadiene (%) | 1,3-butadiene conversion (%) |
|---|---|---|---|---|---|---|
| 72 | 0.16 | 0.00 | 50.50 | 21.03 | 25.40 | 49.20 |
| 288 | 0.14 | 0.00 | 50.57 | 42.80 | 3.58 | 92.95 |
| 498 | 0.50 | 0.35 | 50.24 | 45.94 | 0.00 | 100.00 |

It should also be noted that the catalytic system completely transformed the 1,3-butadiene principally to cis 2-butene without touching the 1-butene molecule which could produce cis or trans 2-butene by isomerization or n-butane after hydrogenation.

EXAMPLE 9

The catalytic system used in Example 1 was used, but the nature of the feed to be hydrogenated was replaced with 2,4-hexadiene.

The catalysis temperature was 22° C. and the hydrogen pressure was 1 MPa.

The concentration of iron in the reaction medium was 200 ppm and the reaction time to reach 80% 1,3-butadiene conversion was 60 seconds.

The results are shown in Table 6.

TABLE 6

| time (sec) | n-C6 (%) | trans 2-hexane (%) | 1-hexane (%) | cis 2-hexane (%) | 2,4-hexadiene (%) | selectivity t-2 hex/Σ hexenes |
|---|---|---|---|---|---|---|
| 45 | 0.40 | 63.25 | 0.15 | 0.70 | 35.45 | 98.67 |
| 60 | 0.35 | 79.40 | 0.20 | 0.95 | 19.15 | 98.57 |
| 80 | 0.50 | 86.70 | 0.20 | 1.10 | 11.50 | 98.52 |
| 95 | 0.45 | 93.10 | 0.20 | 1.50 | 4.80 | 98.21 |
| 110 | 0.85 | 96.85 | 0.20 | 2.05 | 0.10 | 97.73 |

The invention claimed is:

1. A process for the selective hydrogenation of 1,3-butadiene contained in a feed, comprising the passage of a feed containing 1,3-butadiene in contact with a liquid catalyst composition, characterized in that said liquid catalyst composition comprises at least one salt of a transition metal from groups IB, IIB, VB, VIB, VIIB and VIII of the periodic table, at least one ligand and at least one organometallic reducing agent, said contact resulting in a conversion of said 1,3-butadiene to primarily cis-2-butene.

2. A process according to claim 1, characterized in that:
the transition metal salt is selected from halides, acetylacetonates and carboxylates of organic acids containing 2 to 25 carbon atoms;
the reducing agent is selected from organometallic derivatives of at least one metal selected from the group formed by lithium, sodium and aluminium;
the ligand is selected from derivatives of phosphorus, arsenic and antimony and nitrogen-containing ligands.

3. A process according to claim 2, wherein the transistion metal salt is carboxylate selected from acetates, octoates, decanoates, naphthenates, stearates, palmitates, oleates and benzoates.

4. A process according to claim 1, characterized in that the transition metal salt is selected from salts of metals from groups IB, IIB, VIB and VIII of the periodic table.

5. A process according to claim 4, characterized in that the transition metal salt is selected from copper, zinc, chromium, molybdenum, iron, cobalt, nickel, ruthenium and palladium salts.

6. A process according to claim 5, characterized in that the transition metal salt is selected from iron salts.

7. A process according to claim 1, characterized in that the reducing agent is selected from:
organoaluminas with general formula $AlR_y(X)_{3-y}$, in which R is an alkyl group, X is a halide and y=1, 2 or 3;
magnesias with formula $MgR_2$, in which R is as defined above;
aluminoxanes;
sodium borohydride; and
alkaline hydrides and their substitution derivatives comprising 1, 2 or 3 alkoxy groups.

8. A process according to claim 1, characterized in that the ligand derived from phosphorus, arsenic or antimony is selected from ligands with general formulae:

$YR_mX_{3-m}$, $YR_3$, $R_2Y-(CH_2)_n YR_2$, $Y(OR)_3$ and $YOR_3$, in which Y=P, As or Sb; m=0, 1, 2 or 3; R=alkyl, aryl or substituted aryl; X=halogen, and n=0, 1, 2, 3 or 4.

9. A process according to claim 1, characterized in that the nitrogen-containing ligand is selected from amines, polyamines, imidazole, substituted imidazoles, pyrrole, substituted pyrroles, pyrazoles, amide derivatives, imines, diimines and pyridine derivatives.

10. A process according to claim 1 characterized in that a minor proportion of at least one salt of a further transition metal selected from metals from groups IB, VB, VIB, VIIB and VIII is added to the catalyst.

11. A process according to claim 10, characterized in that the principal metal is iron and the additional metal is selected from Co, Ni, Cu, Rh, Pd, Mn, Mo, W and V.

12. A process according to claim 1, characterized in that the catalyst composition is dissolved in at least one organic compound selected from aliphatic or aromatic hydrocarbons, ethers, esters, halogenated hydrocarbons, sulphoxides and amides.

13. A process according to claim 1, characterized in that the catalyst composition is dissolved in at least one ionic liquid with general formula $Q^+A^-$ in which $Q^+$ represents a quaternary ammonium and/or quaternary phosphonium ion and $A^{31}$ represents any anion which is capable of forming a liquid salt at low temperatures, i.e. below 90° C.

14. A process according to claim 13, characterized in that the quaternary ammonium and/or phosphonium ion $Q^+$ has one of the following general formulae:

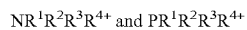

or one of general formulae:

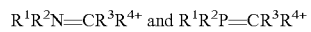

in which $R^1$, $R^2$, $R^3$ and $R^4$, which may be identical or different, each represent hydrogen, the cation $NH_4^+$ being excluded for $NR^1R^2R^3R^{4+}$, or a hydrocarbyl residue containing 1 to 30 carbon atoms.

15. A process according to claim 13, characterized in that the quaternary ammonium and/or phosphonium ion $Q^+$ derives from a nitrogen-containing or phosphorus-containing heterocycle comprising 1, 2 or 3 nitrogen or phosphorus atoms, having one of the following general formulae:

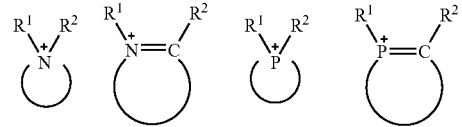

in which the cycles are constituted by 4 to 10 atoms and $R^1$ and $R^2$, which may be identical or different, each represent hydrogen or a hydrocarbyl residue containing 1 to 30 carbon atoms.

16. A process according to claim 13, characterized in that the quaternary ammonium and/or phosphonium ion has one of the following formulae:

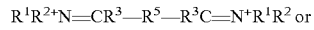

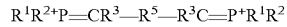

in which $R^1$, $R^2$ and $R^3$, which may be identical or different, each represent hydrogen or a hydrocarbyl residue containing 1 to 30 carbon atoms and $R^5$ an alkylene or phenylene residue.

17. A process according to claim 1, characterized in that the mole ratio between the ligand and the transition metal salt is in the range 0.5/1 to 10/1.

18. A process according to claim 1, characterized in that the ligand is monocoordinating and the ligand/transition metal salt mole ratio is 2/1 to 3/1.

19. A process according to claim 1, characterized in that the ligand is bi-coordinating and the ligand/transition metal salt mole ratio is 1/1 to 1.5/1.

20. A process according to claim 1, characterized in that the mole ratio between the reducing agent and the transition metal salt is 1/1 to 15/1.

21. A process according to claim 1, characterized in that said catalyst composition is employed in a proportion corresponding to a proportion of metallic compounds in the reaction medium of 10 to 10000 ppm by weight.

22. An integrated process for producing 1-butene from a 1-butene rich $C_4$ cut, characterized in that it comprises, as the finishing step, selective hydrogenation of 1,3-butadiene carried out using a process according to claim 1 to obtain a 1,3-butadiene content of less than 10 ppm by weight.

23. A process according to claim 1 conducted under conditions resulting in a selectivity of cis-2-butene of over 98% for an 80% 1,3-butadiene conversion.

24. A process according to claim 23 wherein the catalyst comprises an iron salt and the ligand is an imino compound.

* * * * *

UNITED STATES PATENT AND TRADEMARK OFFICE
CERTIFICATE OF CORRECTION

PATENT NO. : 7,612,245 B2
APPLICATION NO. : 10/519355
DATED : November 3, 2009
INVENTOR(S) : Hillion et al.

Page 1 of 1

It is certified that error appears in the above-identified patent and that said Letters Patent is hereby corrected as shown below:

Column 12, line 21, reads "nary ammonium and/or quaternary phosphonium ion and $A^{31}$", should read -- nary ammonium and/or quaternary phosphonium ion and $A^-$ --.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,612,245 B2 |
| APPLICATION NO. | : 10/519355 |
| DATED | : November 3, 2009 |
| INVENTOR(S) | : Hillion et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Nineteenth Day of October, 2010

David J. Kappos
*Director of the United States Patent and Trademark Office*